(No Model.)
H. E. POEHLMAN.
CAMERA ADJUSTER.
No. 399,345. Patented Mar. 12, 1889.
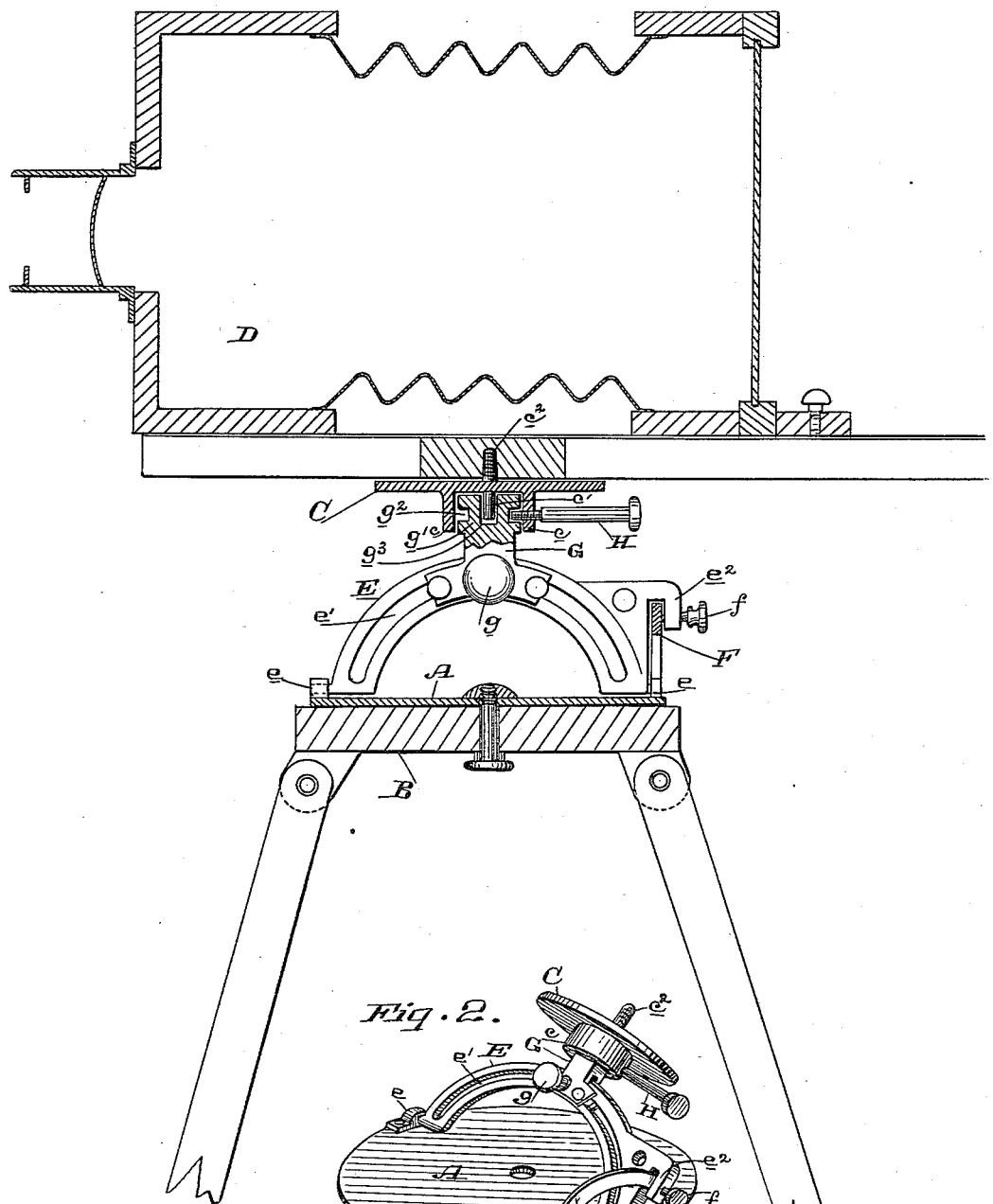
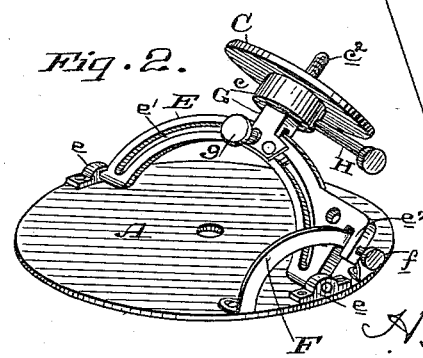
Witnesses,
Geo. H. Strong
J. H. Nurse
Inventor
H. E. Poehlman
By Dewey & Co.
attys

UNITED STATES PATENT OFFICE.

HENRY EDWARD POEHLMAN, OF SAN FRANCISCO, CALIFORNIA.

CAMERA-ADJUSTER.

SPECIFICATION forming part of Letters Patent No. 399,345, dated March 12, 1889.

Application filed November 7, 1888. Serial No. 290,248. (No model.)

*To all whom it may concern:*

Be it known that I, HENRY EDWARD POEHLMAN, of the city and county of San Francisco, State of California, have invented an Improvement in Camera-Adjusters; and I hereby declare the following to be a full, clear, and exact description of the same.

My invention relates to the class of photographic cameras, and especially to means for adjusting and regulating the position of the camera on the tripod; and my invention consists in the combination of a plate secured on the top of the tripod, a plate secured to the base of the camera, and connections between said plates, whereby the latter may have an axial movement, a movement forward and back, and a movement from side to side, as I shall hereinafter fully describe.

The object of my invention is to provide a means for attaching the camera to the tripod, of such character that the camera may turn axially to any suitable position, and may be adjusted to any inclination up or down, and to any inclination laterally, so that, notwithstanding the position of the tripod, the camera may be properly adjusted.

Referring to the accompanying drawings for a more complete explanation of my invention, Figure 1 is a vertical section of my adjuster, showing its application. Fig. 2 is a perspective view of the adjuster.

A is a plate adapted to be secured to the top of the tripod B.

C is a plate having a central screw, $c^2$, whereby it may be secured to the bottom of the camera D. Hinged to the plate A at $e$ is a curved bracket, E, having a slot, $e'$. This bracket may be moved on its hinge-centers from one side to the other, passing through approximately a semicircle, and may be held at any position in its movement by means of a set-screw, $f$, passing through a guide-arm, $e^2$, fitting over and sliding on a fixed curved guide-rack, F, attached to the plate A and against which the screw impinges.

Fitted to the slotted curved bracket E is a standard, G, adapted to be moved in the slot of the bracket, and having a set-screw, $g$, by which it is fixed in any position to which it may be moved. This standard has a cylindrical head, $g'$, provided with an encircling groove, $g^2$, in its face, and with a socket, $g^3$, in its center. The plate C, which is attached to the camera, has a downwardly-extending annular flange, $c$, provided with a central pin, $c'$, and said flange fits over the head of the standard, which forms a journal for it, the pin $c'$ of the flange fitting in the socket $g^3$ of the standard. A set-screw, H, passes through the flange $c$, and is adapted to fit in the groove $g^2$ of the standard-head and to bind the flange thereto, whereby the plate C is fixed in place.

It will be seen that the plate C may have an axial movement about the standard-head as a center, and may be fixed by the screw H in any position to which it may be adjusted. Said plate may also have a movement forward and back with the standard G in the slotted bracket E, whereby its vertical inclination may be determined and fixed, and said plate may also have a movement with the hinged bracket E, whereby its lateral inclination may be determined and fixed. Said plate C being attached to the camera, the latter itself has these several movements, and it follows that, no matter what may be the position of the tripod, the camera may be properly adjusted by one or more of the movements which may be imparted to it. The hinged bracket E also permits the reversal of the camera instantly, so as to take an impression sidewise of the plate by letting the bracket down from a vertical position to a horizontal one, and this movement of the camera may take place on either side, and the camera may then by its axial movement be suitably adjusted.

Having thus described my invention, what I claim as new, and desire to secure by Letters Patent, is—

1. In a camera-adjuster, a slotted curved bracket hinged to the tripod and adapted to be turned from a vertical to a horizontal position, in combination with a plate secured to the camera, said plate being adjustable longitudinally in the slotted curved bracket, substantially as herein described.

2. A camera-adjuster for connecting the camera with the tripod, comprising a hinged slotted curved bracket to be secured to the tripod and adapted to be turned from a vertical to a horizontal position, a standard fitted to and adjustable longitudinally in the slotted bracket, and a plate to be secured to the camera and journaled on the standard, whereby it may have an axial movement, substantially as herein described.

3. A camera-adjuster for connecting the camera with the tripod, consisting of a plate to be secured to the tripod, a plate to be secured to the camera, and intermediate adjustable connections, comprising a slotted curved bracket hinged to the tripod-plate, a standard carried by and movable longitudinally on the slotted bracket, and an axial pivot-connection between the standard and the plate to be secured to the camera, substantially as herein described.

4. A camera-adjuster consisting of the plate to be secured to the tripod, the curved slotted bracket hinged to the plate, the set-screw and fixed guide-rack for holding the bracket in position where adjusted, the standard fitted to and movable longitudinally on the slotted bracket, and set-screw for holding the standard where adjusted, the plate secured to the camera and axially pivoted to the top of the standard, and the set-screw for holding the plate where adjusted, substantially as herein described.

5. In a camera-adjuster, the combination of the plate to be secured to the tripod, the curved slotted bracket, the standard mounted and adjustable on the bracket, said standard having a cylindrical head with a central socket, the plate C, having in its upper surface a screw for securing it to the camera, and on its lower surface an annular flange fitting over the head of the standard, and a central pin fitting in the socket of said head, substantially as herein described.

In witness whereof I have hereunto set my hand.

HENRY EDWARD POEHLMAN.

Witnesses:
S. H. NOURSE,
J. H. BLOOD.